United States Patent Office 3,420,801
Patented Jan. 7, 1969

3,420,801
PROCESS FOR THE MANUFACTURE OF
POLYETHYLENE TEREPHTHALATE
Herbert Fitz, Wiesbaden-Biebrich, Germany, assignor to
Kalle Aktiengesellschaft Wiesbaden-Biebrich, Germany
No Drawing. Filed Feb. 7, 1964, Ser. No. 343,235
Claims priority, application Germany, Feb. 9, 1963,
K 48,902
U.S. Cl. 260—75                                        9 Claims
Int. Cl. C08g *17/015;* C08g *51/58*

ABSTRACT OF THE DISCLOSURE

This invention relates to a process for the manufacture of polyethylene terephthalate by polycondensing bis-hydroxyethyl terephthalate in the presence of stannous oxalate as a catalyst.

---

The manufacture of this material from terephthalic acid, or its esters with lower aliphatic alcohols and glycol, is known. A preferred starting material is terephthalic acid dimethyl ester which is easy to purify and which is first subjected to an ester radical exchange, in the presence of a reesterification catalyst, with an excess of glycol at a temperature in the range of about 170 to 230° C. to form bis-hydroxyethyl terephthalate which is then polycondensed in the presence of a condensation catalyst. The polycondensation, which proceeds with elimination of glycol, is generally carried out while considerably reducing the gas pressure, for example to about 0.8 mm. Hg or below, at a temperature in the range of 270 to 280° C.

A number of catalysts suitable for the processes referred to above are known. Thus, for the reesterification of dimethyl terephthalate with diols there have been used elements of basic reaction of the first and second group of the Periodic Table and their compounds, e.g. their oxides, hydrides, acetates, formates and glycolates have been used as catalysts. For the polycondensation, preferably employed are compounds of elements of the third to sixth group of the Periodic Table. In actual practice only a few of these catalysts are used since the requirements thereof, such as short reaction times during the polycondensation, an appropriately high molecular weight and a substantial absence of color in the polyester, can be satisfied with only a few catalysts. Thus, for example, a preferred condensation catalyst in the manufacture of polyethylene terephthalate from bis-hydroxyethyl terephthalate is antimony trioxide, $Sb_2O_3$.

In view of the generally long condensation time needed, i.e. several hours, it is imperative to make certain additions of antioxidants at the beginning of the condensation reaction to reduce the amount of undesired decomposition products formed and thus to obtain clear and thermally stable final condensates. This is best achieved with trivalent and pentavalent phosphorus compounds, esters of phosphorous acid and of phosphoric acid being preferably used in industry. By virtue of their ready accessibility and other advantages, preferably employed are triphenyl phosphite, triphenyl phosphate or phosphorous acid in a concentration of 0.01 to 0.05% by weight, calculated on the weight of bis-hydroxyethyl terephthalate used.

The required short reaction times, high molecular weights, high melting points, clarity and thermal stability of the resulting condensation products and compatibility with the reesterification catalysts and phosphorus-containing additives used can be achieved with only a few condensation catalysts. Especially the presence of oxidation-inhibiting phosphorus compounds, which is desirable for the above-mentioned reasons, disturbs the catalytic efficiency of the otherwise often very satisfactory catalyst systems. Further requirements to be satisfied by the polycondensation catalyst arise as regards the manufacture of semifinished products, such as fibers and films, from the resulting synthetic resins, for which good processing properties, more especially capacity for extrusion, are desirable, and furthermore as regards the use of films as electrical insulating material, which is required to have advantageous electrical properties. As is known, the use of antimony trioxide as a condensation catalyst in combination with the catalysts used in industry in the reesterification of dimethyl terephthalate with glycol to form bis-hydroxyethyl terephthalate, such as zinc acetate, manganese acetate and calcium acetate, has satisfied the requirements listed above to the most satisfactory extent.

The present invention is based on the observation that stannous oxalate used as catalyst for the polycondensation of bis-hydroxyethyl terephthalate to form polyethylene terephthalate satisfies the aforementioned requirements of an efficient catalyst system to an excellent degree and is superior to the known catalysts for this purpose, such as antimony trioxide, in important respects.

The present process is performed with the use of about 0.005 to 0.1% by weight, preferably 0.01 to 0.03% by weight of stannous oxalate, calculated on the weight of terephthalic acid dimethyl ester used.

Using 0.005 to 0.1% by weight of stannous oxalate as a condensation catalyst, it is possible to condense bis-hydroxyethyl terephthalate (which has been prepared in known manner from dimethyl terephthalate and glycol in the presence of a reesterification catalyst, e.g. of zinc, cobalt, manganese or calcium acetate, and still contains the reesterification catalyst) to colorless products of high molecular weight having high melting points, namely over 260° C. on the average, and excellent thermal stability. These two properties are very valuable in the manufacture of high-grade semi-finished products such as fibers and film by extrusion, since a high melting point and good thermal stability are among the most important requirements to be satisfied by the raw material if it is to resist the extremely high thermal stresses associated with shaping from the melt without undergoing detrimental changes.

In both these respects stannous oxalate is a better catalyst than antimony trioxide, as is demonstrated by the large-scale comparative test described in Example 5 below. It is a further advantage that stannous oxalate as a polycondensation catalyst is excellently compatible with the conventionally used oxidation-inhibiting trivalent and pentavalent phosphorus compounds. Esters of phosphorous acid and phosphoric acid, or phosphorous acid itself, may be added in amounts up to 0.05% by weight without any reduction in the catalytic activity appearing. In the latter respect, stannous oxalate, compared with the known catalyst systems, is a polycondensation catalyst of particularly rapid action and exceeds, as regards condensation speed, even antimony trioxide used in the same molar concentration.

It has further been observed that stannous oxalate used as a polycondensation catalyst renders it possible to condense bis-hydroxyethyl terephthalate (prepared from dimethyl terephthalate and glycol in the presence of a reesterification catalyst in the form of a mixture of cobalt acetate and calcium acetate) to form polyethylene terephthalate which, apart from the high transparency displayed by all polyethylene terephthalates prepared in relatively thick layers by the present process, possesses a metallic luster which is desirable in the manufacture of films.

The following examples further illustrate the invention:

EXAMPLE 1

A mixture of 100 grams of terephthalic acid dimethyl ester (DMT), 80 grams of ethylene glycol, and 0.02% by weight of zinc acetate calculated on DMT (=20 mg.), was reesterified in a glass apparatus at 160–220° C. until methanol was completely eliminated. 0.01% (=10 mg.)

of stannous oxalate was then added as a condensation catalyst and the batch was polycondensed for two hours at a temperature of 250° C. and then for a further 75 minutes at a temperature of 275° C. under vacuum, with elimination of glycol. Duyring the condensation, the vacuum was so adjusted that during the first 2 hours, with the temperature maintained at 250° C., the pressure above the condensation bath was gradually reduced from 760 mm. Hg to 10 mm. Hg and then, during the ensuing reaction performed for 75 minutes at a temperature of 275° C., a pressure of 0.5 mm. Hg was maintained. The resulting polyester was colorless, had a melting point of 263° C. and a specific viscosity ($\eta_{spec}$) of 0.93 (determined in 1% solution at a temperature of 25° C. in tetrachlorethane: phenol=4:6) and it was eminently suitable for spinning into filaments.

EXAMPLE 2

The process of Example 1 was repeated with the addition of 0.05% (=50 mg.) of triphenyl phosphite at the commencement of the condensation, but in the second period the polycondensation was performed for only 60 minutes (instead of 75 minutes) at a temperature of 275° C. under a pressure of 0.5 mm. Hg. The resulting colorless polycondensate had a melting point of 263° C. and a specific viscosity ($\eta_{spec}$) of 0.94.

EXAMPLE 3

100 grams of DMT were reesterified as described in Example 1 with 80 grams of ethylene glycol in the presence of 0.04% (=40 mg.) of calcium acetate. 20 mg. of stannous oxalate were then added as a condensation catalyst and 25 mg. of triphenyl phosphite as an antioxidant, and the mixture was polycondensed for 2 hours at a temperature of 250° C. and a pressure decreasing from 760 to 10 mm. Hg, and for 90 minutes at a temperature of 275° C. and a pressure of 0.5 mm. Hg. The resulting colorless condensate had a melting point of 262° C., and a specific viscosity ($\eta_{spec}$) of 0.80; it was easy to spin and stretch.

EXAMPLE 4

The process of Example 3 was repeated but with the use of 0.04% of calcium acetate as a reesterification catalyst and 0.02% of stannous oxalate as a condensation catalyst, using 0.01% of phosphorous acid instead of 0.025% of triphenyl phosphite. The resulting polyester had a specific viscosity ($\eta_{spec}$) of 1.01 and was easy to spin.

EXAMPLE 5

1500 kg. of dimethyl terephthalate were reesterified with 1200 kg. of ethylene glycol in the reesterification reactor of an industrial polyester installation, in the presence of 300 grams of zinc acetate as a reesterification catalyst, for 3.5 hours at a temperature of 160 to 220° C. until the methanol had been quantitatively eliminated. The batch was then introduced, under pressure, into a condensation reactor, where the excess of glycol was distilled off under atmospheric pressure at a temperature of 220 to 250° C. 300 grams (=0.02%) of stannous oxalate as a condensation catalyst and 375 grams of triphenyl phosphite as an antioxidant were then added and the mixture was polycondensed for 6 hours at a temperature of 275° C. and a pressure of 0.5 mm. Hg. The resulting melt was granulated and further processed. The material was of good clarity, had a melting point of 262° C. and a specific solution viscosity ($\eta_{sepc}$) of 0.80.

When the experiment was repeated, using 0.03% of antimony trioxide instead of 0.02% of stannous oxalate as a condensation catalyst, a condensation time of 7 hours at a temperature of 275° C. under 0.5 mm. Hg pressure was required to reach the same specific viscosity ($\eta_{spec}$) of 0.8. The product had a melting point of 258° C.

Both batches were then processed in an industrial installation for the manufacture of stretched films. Whereas the material prepared with antimony trioxide, during the processing (drying, extruding, stretching, fixing) showed a reduction in its solution viscosity of 11%, the material prepared with stannous oxalate as a condensation catalyst, under completely identical processing conditions lost only 3.8% of its solution viscosity and had a correspondingly improved clarity.

EXAMPLE 6

1500 grams of dimethyl terephthalate were reesterified with 1200 grams of ethylene glycol and a mixture of 300 mg. of cobalt acetate and 200 mg. of calcium acetate in a condensation apparatus of stainless steel. 300 mg. of stannous oxalate as a condensation catalyst and 375 mg. (=0.025%) of triphenyl phosphite as an antioxidant were then added and the batch was polycondensed for 2 hours, during which the pressure above the melt was gradually reduced from 760 to 1 mm. Hg, at a temperature of 250° C., and for another 150 minutes at a temperature of 275° C. under a pressure of 0.5 mm. Hg. The resulting product, which issued from the apparatus after conversion into a film, had a melting point of 266° C. and a specific viscosity ($\eta_{spec}$) of 0.85. It had a metallic luster and the film was completely clear.

It will be obvious to those skilled in the art that many modifications may be made within the scope of the present invention without departing from the spirit thereof, and the invention includes all such modifications.

What is claimed is:

1. A process for the preparation of polyethylene terephthalate which comprises polycondensing bis-hydroxyethyl terephthalate in the presence of stannous oxalate as a polycondensation catalyst and under effective polycondensation conditions.

2. A process according to claim 1 in which the polycondensation is effective in the presence of a member selected from the group consisting of trivalent and pentavalent phosphorus compounds.

3. A process according to claim 2 in which the phosphorus compound is triphenyl phosphite.

4. A process according to claim 2 in which the phosphorus compound is phosphorus acid.

5. A process according to claim 1 in which the bishydroxyethyl terephthalate is contained in a reesterification mixture obtained from terephthalic acid dimethyl ester and ethylene glycol with a re-esterification catalyst.

6. A process according to claim 5 in which the stannous oxalate is present in a quantity in the range of about 0.005 to 0.1 percent by weight, based on the quantity of terephthalic acid dimethyl ester employed.

7. A process according to claim 5 in which the reesterification catalyst is selected from the group consisting of zinc acetate, cobalt acetate, manganese acetate, calcium acetate, and mixtures thereof.

8. A process according to claim 5 in which the reesterification catalyst is calcium acetate and phosphorous acid is employed as an antioxidant.

9. A process according to claim 5 in which the reesterification catalyst is a mixture of calcium acetate and cobalt acetate.

References Cited

UNITED STATES PATENTS

| | | | |
|---|---|---|---|
| 2,465,319 | 3/1949 | Whinfield et al. | 260—75 |
| 2,921,051 | 1/1960 | Amborski et al. | 260—75 |
| 3,055,869 | 12/1962 | Wilson et al. | 260—75 |
| 3,057,824 | 10/1962 | Le Bras et al. | 260—75 |
| 3,070,575 | 12/1962 | Cramer | 260—75 |
| 3,110,547 | 11/1963 | Emmert | 260—75 |
| 3,245,959 | 4/1966 | Roeser | 260—75 |
| 3,194,791 | 2/1968 | Wilson et al. | 260—75 |

WILLIAM H. SHORT, *Primary Examiner.*

L. P. QUAST, *Assistant Examiner.*

U.S. Cl. X.R.

260—475, 45.7